(12) United States Patent
Yu et al.

(10) Patent No.: US 10,357,084 B2
(45) Date of Patent: Jul. 23, 2019

(54) EYELETS FOR TARPAULIN

(71) Applicant: Chung Han Yu, Yongin-si, Gyeonggi-do (KR)

(72) Inventors: Chung Han Yu, Yongin-si (KR); Young Kwon Song, Incheon (KR)

(73) Assignee: Chung Han Yu, Yongin-si, Gyeonggi-do (KR)

( * ) Notice: Subject to any disclaimer, the term of this patent is extended or adjusted under 35 U.S.C. 154(b) by 0 days.

(21) Appl. No.: 15/741,766

(22) PCT Filed: Jul. 21, 2015

(86) PCT No.: PCT/KR2015/007539
§ 371 (c)(1),
(2) Date: Jan. 4, 2018

(87) PCT Pub. No.: WO2017/014334
PCT Pub. Date: Jan. 26, 2017

(65) Prior Publication Data
US 2018/0192746 A1    Jul. 12, 2018

(51) Int. Cl.
*E04H 15/64* (2006.01)
*A44B 13/00* (2006.01)
*C08L 23/06* (2006.01)
*B60J 7/10* (2006.01)

(52) U.S. Cl.
CPC .......... *A44B 13/0076* (2013.01); *C08L 23/06* (2013.01); *E04H 15/64* (2013.01); *B60J 7/104* (2013.01); *C08L 2205/025* (2013.01)

(58) Field of Classification Search
CPC ......... A44B 13/007; E04H 15/64; B60J 7/104

USPC .............. 24/713.6; 114/115; 135/116, 120.9, 135/120.4
See application file for complete search history.

(56) References Cited

U.S. PATENT DOCUMENTS

| 5,415,915 A | 5/1995 | Oh |
| 5,588,191 A | 12/1996 | Solbeck |
| 8,407,868 B2 * | 4/2013 | Chung ................. A44B 13/007 114/114 |
| 2006/0200954 A1 | 9/2006 | Chung |

FOREIGN PATENT DOCUMENTS

| JP | 3104553 U | 9/2004 |
| JP | 2005-082910 A | 3/2005 |
| KR | 10-1995-0703688 A | 9/1995 |
| KR | 20-1996-0001517 Y1 | 2/1996 |
| KR | 20-0218087 Y1 | 3/2001 |
| KR | 20-0350408 Y1 | 5/2004 |

OTHER PUBLICATIONS

International Search Report for PCT/KR2015/007539 dated Apr. 19, 2016 from Korean Intellectual Property Office.

* cited by examiner

*Primary Examiner* — Jack W Lavinder
(74) *Attorney, Agent, or Firm* — Revolution IP, PLLC

(57) ABSTRACT

An eyelets for a tarpaulin includes a female eyelet; and a male eyelet coupled to the female eyelet with a tarpaulin interposed therebetween, wherein the female eyelet and the male eyelet are coupled to each other through compression and bonding while the tarpaulin is inserted therebetween and are made of an olefin-based resin.

8 Claims, 4 Drawing Sheets

【Figure 1】
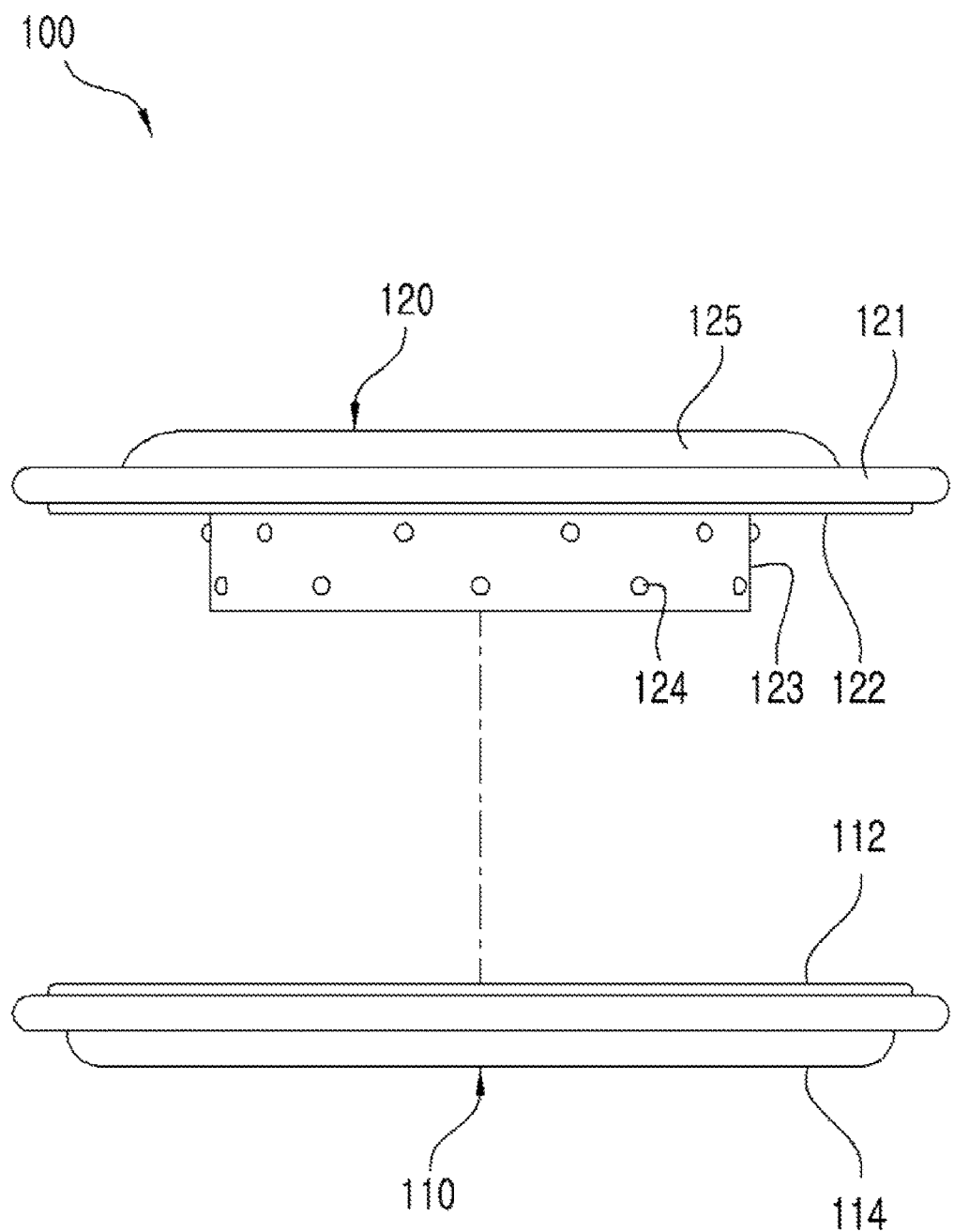

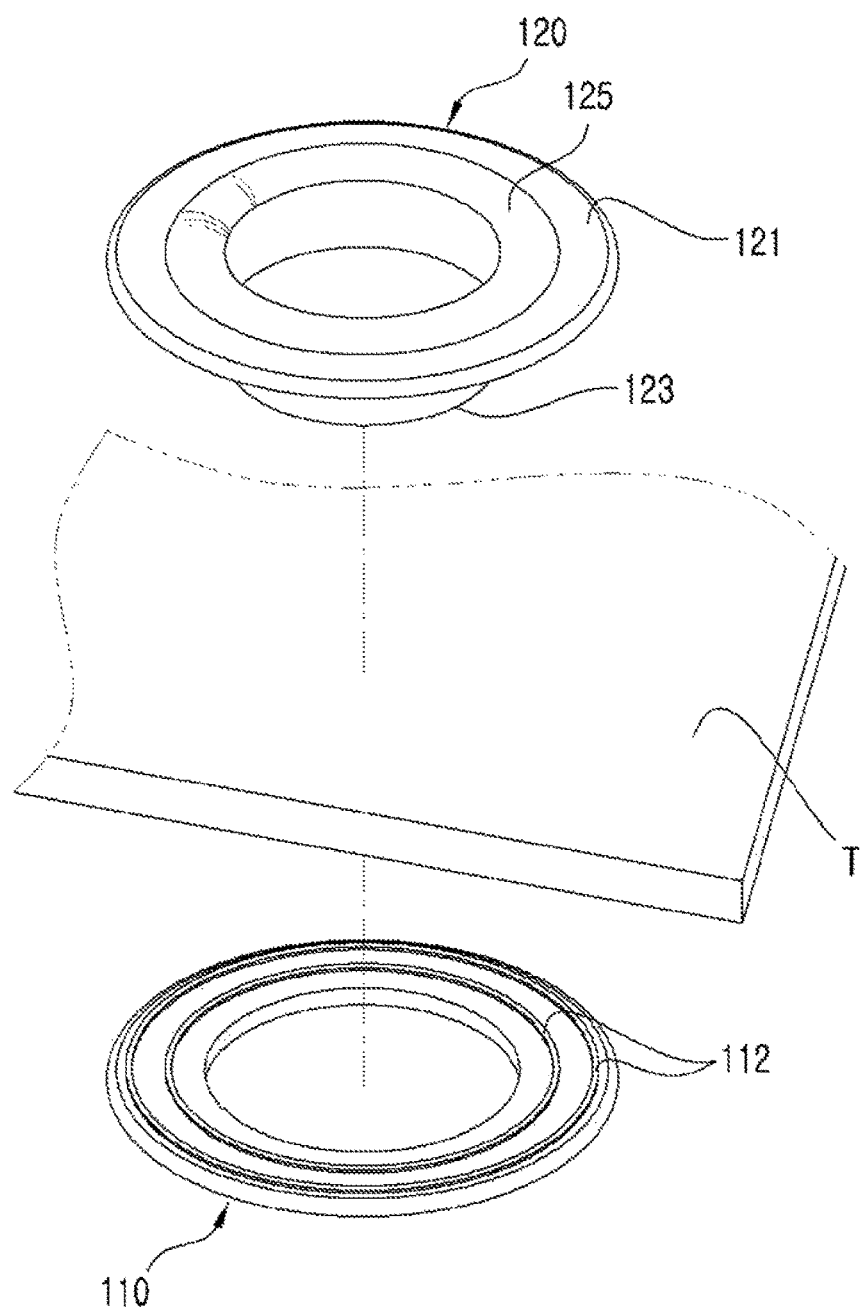
【Figure 2】

【Figure 3】
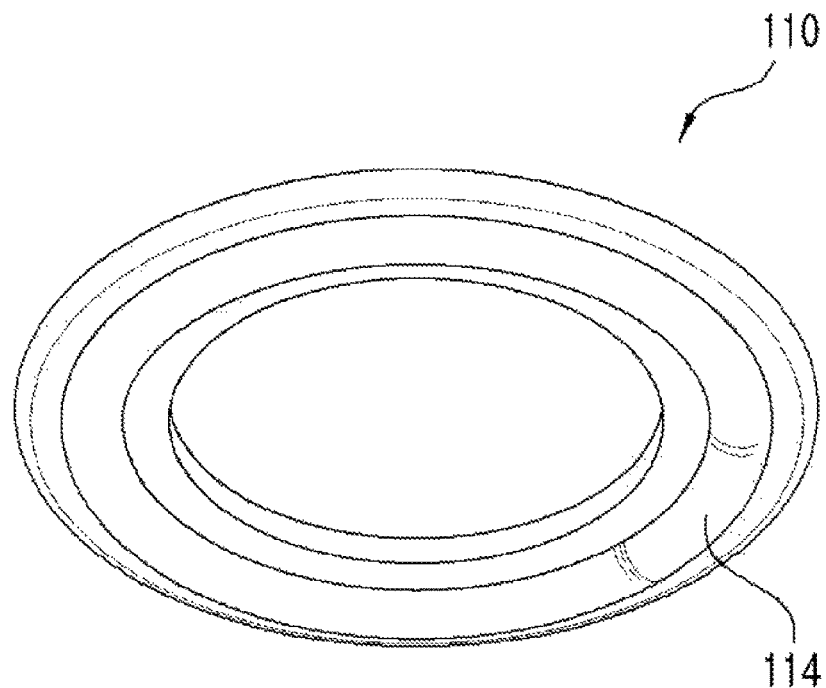
【Figure 4】
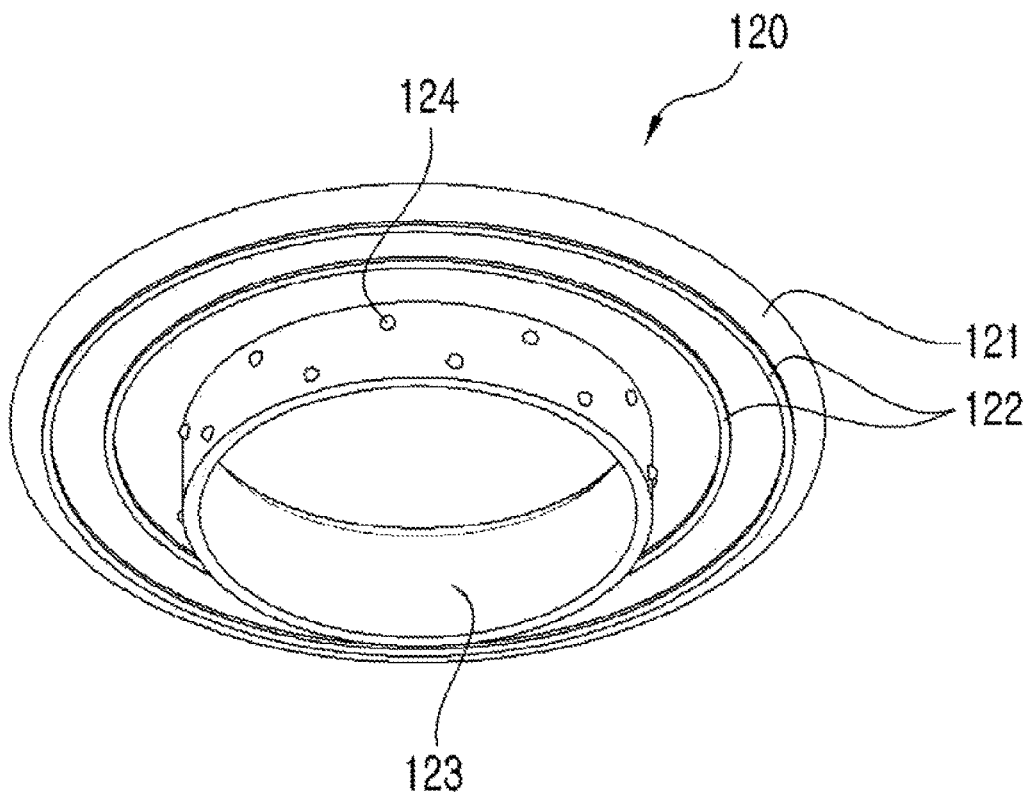

【Figure 5】
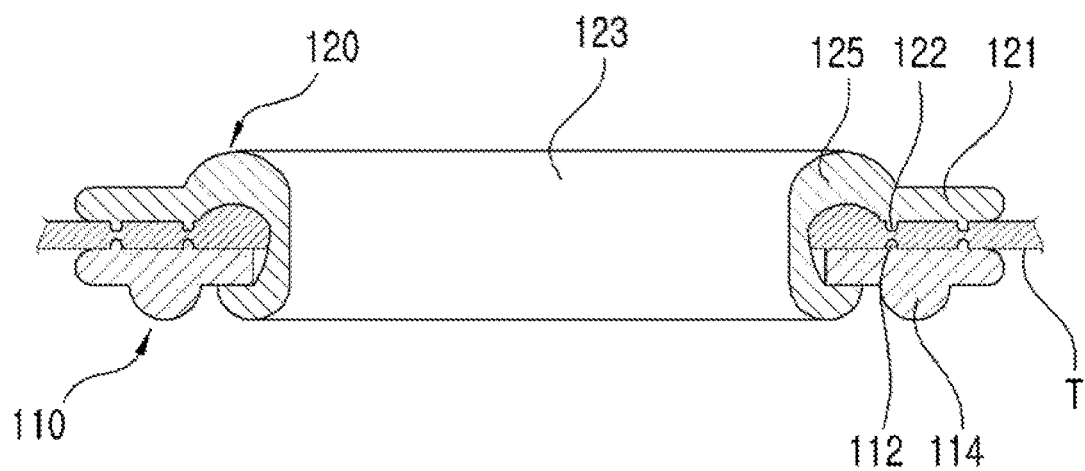

EYELETS FOR TARPAULIN

TECHNICAL FIELD

The present invention relates to eyelets for a tarpaulin.

BACKGROUND ART

Generally, a tarpaulin refers to a waterproof fabric that is as lightweight, flexible, and tough as vinyl, and is formed by coating upper and lower surfaces of a fabric, in which yarns made of low density polyethylene (LDPE) and high density polyethylene (HDPE) are crossed as a weft and a warp, with polyethylene (PE), which is the same material as the yarns.

Such a tarpaulin can be used for a variety of purposes, for example, as a lid for protecting goods and blocking sunlight in trucks, forklifts, tents, warehouses, or the like.

Here, when the tarpaulin is used as a lid, holes are drilled in edges of the lid and ropes pass through the holes to fix the tarpaulin, and thus the holes can be damaged by the ropes. In order to prevent the damage of the holes, eyelets are brought into contact with the ropes by the eyelets being suitably coupled to perimeters of the holes, so that the holes of the tarpaulin can be protected.

Such eyelets are proposed in Korean Registered Utility Model No. 20-0350408 (Application Date: Feb. 26, 2004 and Publication Date: May 12, 2004, hereinafter, referred to as "the related art").

The related art relates to eyelets, and by providing eyelets made of a polycarbonate (PC) material which is harmless to human body, the eyelets are harmless to the human body and are easily produced. Since strong coupling is achieved at an outer periphery of the eyelet by providing an appropriate incline to a material of the eyelet coupled to a tent, disadvantages of a conventional iron, brass, or aluminum eyelet in which the material thereof is not elastic at a small size due to material properties thereof are overcome so that the coupling between the eyelets and a fabric of the tent may be further strengthened and spinning in place may be prevented. Sharp protrusions are formed at end portions of the eyelets coupled to the fabric of the tent so that the coupling between the eyelets and the fabric of the tent may be further strengthened. The eyelets and the fabric of the tent are coupled just by applying an appropriate force, and thus a manufacturing process is easily performed, such that production costs may be reduced and productivity may be improved.

However, in the related art, the eyelets should be separated from the tent when recycling the tent after a certain period of use of the eyelet, and the eyelets are coupled to the tent through compression by physical force, and thus there is still a problem in that coupling strength between the tent and the eyelets is poor.

DISCLOSURE

Technical Problem

The present invention is directed to providing a technique in which coupling strength between a tarpaulin and eyelets can be further strengthened and the tarpaulin may be recycled along with the eyelets.

Technical Solution

One aspect of the present invention provides eyelets for a tarpaulin. The eyelets for a tarpaulin include a female eyelet and a male eyelet coupled to the female eyelet with a tarpaulin interposed therebetween, and the female eyelet and the male eyelet are coupled to each other through compression and bonding while the tarpaulin is inserted therebetween and are made of an olefin-based resin.

Here, the olefin-based resin may be any one of polyethylene (PE) and polypropylene (PP).

The female eyelet may be provided to have an annular shape in which a circular hollow is formed in a central portion thereof.

Further, at least one first bonding protrusion may be provided on one side surface of the female eyelet, which is in contact with the tarpaulin, to have a predetermined diameter along a perimeter of the female eyelet.

In addition, the male eyelet may include a base portion having an annular shape in which a circular hollow is formed in a central portion thereof, and a cylindrical portion configured to extend from an inner perimeter provided by the hollow formed in the central portion of the base portion so as to be orthogonal to the base portion and to form a hollow cylindrical space, wherein a curved portion curvedly formed in a portion in which the base portion and the cylindrical portion are in orthogonal contact with each other may be provided and a diameter of the cylindrical portion may be smaller than a diameter of a hollow formed in a central portion of the female eyelet so as to be coupled to the female eyelet.

Further, at least one second bonding protrusion formed to protrude at a position corresponding to the first bonding protrusion of the female eyelet may be provided on one side surface of the base portion, which is in contact with the tarpaulin, to have a predetermined diameter along the perimeter of the base portion.

Advantageous Effects

The present invention has the following effects.

First, a female eyelet and a male eyelet are coupled to an edge of a tarpaulin through compression by physical force, and the tarpaulin, the female eyelet, and the male eyelet are bonded to each other by ultrasonic waves, and thus coupling strength among the tarpaulin, the female eyelet, and the male eyelet can be made stronger.

Second, since the female eyelet and the male eyelet are made of an olefin-based resin having thermoplasticity and may be recycled along with the tarpaulin, there is no need for the cumbersome task of separating the eyelets from the tarpaulin for recycling expired tarpaulin. Accordingly, disposal costs for waste eyelets and production costs of the eyelets can be reduced.

DESCRIPTION OF DRAWINGS

FIG. 1 is an exploded front view illustrating eyelets for a tarpaulin according to an exemplary embodiment of the present invention.

FIG. 2 is an exploded perspective view illustrating a tarpaulin and eyelets for a tarpaulin according to an exemplary embodiment of the present invention.

FIG. 3 is a rear view illustrating a female eyelet of eyelets for a tarpaulin according to an exemplary embodiment of the present invention.

FIG. 4 is a rear view illustrating a male eyelet of eyelets for a tarpaulin according to an exemplary embodiment of the present invention.

FIG. 5 is a cross-sectional view illustrating a state in which a tarpaulin and eyelets for a tarpaulin according to an exemplary embodiment of the present invention are coupled to each other.

MODES OF THE INVENTION

Hereinafter, when it is determined that detailed descriptions of related well-known technology may unnecessarily obscure the gist of the present invention, detailed descriptions thereof (e.g., a specific process performed by a dedicated machine that couples eyelets to edges of a tarpaulin) will be omitted. In addition, the numbers (e.g., a first bonding protrusion, and a second bonding protrusion, and the like) used in description of the specification are used only to distinguish one element from another.

Moreover, terms used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way.

Therefore, since the embodiments described in this specification and configurations illustrated in drawings are only exemplary embodiments and do not represent the overall technological scope of the present invention, it should be understood that the present invention covers various equivalents, modifications, and substitutions at the time of filing of this application.

The exemplary embodiments of the present invention will be described in more detail, and the already known technological parts will be omitted or compressed for the sake of simplicity of explanation.

FIG. 1 is an exploded front view illustrating eyelets for a tarpaulin according to an exemplary embodiment of the present invention, FIG. 2 is an exploded perspective view illustrating a tarpaulin and the eyelets for a tarpaulin according to the exemplary embodiment of the present invention, FIG. 3 is a rear view illustrating a female eyelet of the eyelets for a tarpaulin according to the exemplary embodiment of the present invention, FIG. 4 is a rear view illustrating a male eyelet of the eyelets for a tarpaulin according to the exemplary embodiment of the present invention, and FIG. 5 is a cross-sectional view illustrating a state in which a tarpaulin and the eyelets for a tarpaulin according to the exemplary embodiment of the present invention are coupled to each other.

Referring to FIGS. 1 to 5, eyelets 100 for a tarpaulin according to the exemplary embodiment of the present invention include a female eyelet 110 and a male eyelet 120 coupled to the female eyelet 110 with a tarpaulin T interposed therebetween.

Here, a material of each of the female eyelet 110 and the male eyelet 120 may include an olefin-based resin, and more particularly, the olefin-based resin may include any one of polyethylene (PE) and polypropylene (PP).

Further, the material of each of the female eyelet 110 and the male eyelet 120 according to the exemplary embodiment of the present invention may preferably include a mixture of low density polyethylene (LDPE) and high density polyethylene (HDPE).

As illustrated in FIG. 2, by utilizing properties of these materials, the eyelets 100 for a tarpaulin of the present invention may allow the female eyelet 110 and the male eyelet 120 to be coupled to each other while the tarpaulin T is positioned between the female eyelet 110 and the male eyelet 120 by a dedicated machine that is capable of compressing by physical force and bonding by ultrasonic waves.

Specifically, holes are drilled in the tarpaulin T by the dedicated machine to couple the tarpaulin T to the female eyelet 110 and the male eyelet 120, and the tarpaulin T is made of a PE material, and thus one surface of the tarpaulin T is bonded to the female eyelet 110 and the other surface of the tarpaulin T is bonded to the male eyelet 120 by ultrasonic waves so that the female eyelet 110 and the male eyelet 120 are coupled to each other.

Generally, the eyelets should be separated from the tarpaulin when recycling expired tarpaulin and eyelets. The female eyelet 110 and the male eyelet 120 of the eyelets 100 for a tarpaulin of the present invention are made of an olefin-based resin having thermoplasticity so that the tarpaulin T, the female eyelet 110, and the male eyelet 120 may be recycled together. Therefore, there is no need to separate or discard the eyelets, and production costs of the eyelets may be reduced.

Further, since the female eyelet 110 and the male eyelet 120 are made of a PE material, have more elasticity than other materials (e.g., aluminum, polycarbonate, or the like), and do not wear or deform easily, injury to the hand of an operator when the ropes bound to the eyelets 100 for a tarpaulin are cut or fixed by the operator may be prevented.

The female eyelet 110 is provided to have an annular shape in which a circular hollow is formed in a central portion thereof as illustrated in FIGS. 2 and 3, and includes first bonding protrusions 112 bonded to the tarpaulin T and a deformation support portion 114.

Here, the first bonding protrusions 112 are formed to protrude from one side surface of the female eyelet 110, which is in contact with the tarpaulin, to have a predetermined diameter along a perimeter of the female eyelet 110.

Further, two first bonding protrusions 112 of the eyelets 100 for a tarpaulin according to the exemplary embodiment of the present invention are provided as illustrated in FIG. 2, but the present invention is not limited thereto, and the first bonding protrusions 112 of the eyelets 100 for a tarpaulin serve to increase coupling strength when the female eyelet 110 is bonded to the tarpaulin T.

Specifically, the first bonding protrusions 112 are bonded together to the tarpaulin T by thermal energy generated from ultrasonic waves so that the first bonding protrusions 112 serve to more firmly couple the female eyelet 110 to the tarpaulin T, and thus the coupling strength and stability between the eyelets 100 for a tarpaulin of the present invention and the tarpaulin T are further improved.

The deformation support portion 114 is formed to protrude from a bottom surface of the female eyelet 110 to have a predetermined diameter along the perimeter of the female eyelet 110 as illustrated in FIG. 3, and serves to prevent wear or deformation after the female eyelet 110 and the male eyelet 120 are coupled.

The male eyelet 120 is coupled to the female eyelet 110 with the tarpaulin T interposed therebetween as illustrated in FIG. 2, and includes a base portion 121, a cylindrical portion 123, and a curved portion 125.

Here, the base portion 121 is provided to have an annular shape in which a circular hollow is formed in a central portion thereof, as illustrated in FIGS. 2 and 4, and includes second bonding protrusions 122 bonded to the tarpaulin T.

Specifically, the second bonding protrusions 122 are preferably provided at positions corresponding to the first bonding protrusion 112 so as to be formed to protrude from one side surface of the base portion 121, which is in contact with the tarpaulin T, and to have a predetermined diameter along a perimeter of the base portion 121, as illustrated in FIG. 5, but the positions and shapes of the first bonding protrusions 112 and the second bonding protrusions 122 are not limited to those in the drawings. The second bonding protrusions 122 may be bonded to the tarpaulin T in the same manner as the first bonding protrusions 112 and may be provided in various positions and shapes in order to improve the coupling strength between the male eyelet 120 and the tarpaulin T.

Further, the second bonding protrusions 122 are bonded together to the tarpaulin T by the thermal energy generated from the ultrasonic waves so that the second bonding protrusions 122 serve to more firmly couple the male eyelet 120 to the tarpaulin T, and thus the coupling strength and stability between the eyelets 100 for a tarpaulin of the present invention and the tarpaulin T are further improved.

The cylindrical portion 123 extends from an inner perimeter through the hollow formed in the central portion of the base portion 121 so as to be orthogonal to the base portion 121 to form a hollow cylindrical space. The cylindrical portion 123 is inserted into the hollow formed in the central portion of the female eyelet 110 with the tarpaulin T interposed therebetween and is coupled to the female eyelet 110.

Here, a diameter of the cylindrical portion 123 is preferably smaller than a diameter of the hollow formed in the central portion of the female eyelet 110 so as to be inserted and coupled to the hollow formed in the central portion of the female eyelet 110.

Further, as illustrated in FIG. 5, when the cylindrical portion 123 is coupled to the female eyelet 110 with the tarpaulin T interposed therebetween, a portion of the cylindrical portion 123 is plastically deformed through compression by physical force so that an outer circumferential surface of the cylindrical portion 123 is brought into contact with and coupled to the female eyelet 110, and thus the cylindrical portion 123 serves to firmly fix the female eyelet 110 and the male eyelet 120 to improve the coupling strength.

In this case, a diameter of a portion of the cylindrical portion 123 (hereinafter, referred to as "a deformed portion") which is plastically deformed is preferably smaller than a diameter of the deformation support portion 114 formed in the female eyelet 110 in order to minimize wear or deformation due to external friction.

Therefore, the deformed portion of the cylindrical portion 123 serves to firmly fix the female eyelet 110 and the male eyelet 120, is horizontally aligned with the deformation support portion 114, and is protected by the deformation support portion 114 so that the coupling strength is prevented from being weakened by the external friction.

In addition, as illustrated in FIG. 4, a plurality of fixing protrusions 124 are formed along a perimeter of the outer circumferential surface of the cylindrical portion 123. Positions and shapes of the fixing protrusions 124 are not limited to those in the drawings, and the fixing protrusions 124 may be provided in various positions and shapes.

Since the fixing protrusions 124 are bonded to the female eyelet 110 by the thermal energy of the ultrasonic waves when the female eyelet 110 and the cylindrical portion 123 are coupled in the same manner as the first bonding protrusion 112 and the second bonding protrusion 122, the fixing protrusions 124 serve to improve the coupling strength between the female eyelet 110 and the male eyelet 120.

Meanwhile, as illustrated in FIGS. 2 and 5, the curved portion 125 provided to be bent at a portion of the male eyelet 120, in which the base portion 121 and the cylindrical portion 123 are in orthogonal contact with each other, is formed, and the curved portion 125 provides a concave space when the deformed portion of the cylindrical portion 123 is plastically deformed and bent by the compression so that the deformed portion and the deformation support portion 114 may be horizontally aligned with each other. That is, due to the compression, a degree of protrusion of the deformation support portion 114 is the same as a degree of protrusion of the deformed portion of the curved portion 125 which is in contact with a rear surface of the female eyelet 110. Accordingly, the deformation support portion 114 may protect the deformed portion so that coupling strength between the deformed portion and the female eyelet 110 is not weakened by external friction.

As described above, the eyelets 100 for a tarpaulin of the present invention have the following effects.

First, the female eyelet and the male eyelet are coupled to the edge of the tarpaulin through compression by physical force, and the tarpaulin, the female eyelet, and the male eyelet are bonded to each other by ultrasonic waves, and thus coupling strength among the tarpaulin, the female eyelet, and the male eyelet may be made stronger.

Second, since the female eyelet and the male eyelet are made of an olefin-based resin having thermoplasticity and may be recycled along with the tarpaulin, there is no need for the cumbersome task of separating the eyelets from the tarpaulin for recycling expired tarpaulin. Accordingly, disposal costs for waste eyelets and production costs of the eyelets may be reduced.

As described above, although the detailed descriptions of the present invention have been disclosed for illustrative purposes, since the present invention has been described with reference to the exemplary embodiments, it should be understood that the present invention is not limited to the disclosed exemplary embodiments. The scope of the present invention should be understood as the following claims and their equivalents.

REFERENCE NUMERALS

100: EYELETS FOR A TARPAULIN
110: FEMALE EYELET
112: FIRST BONDING PROTRUSION
114: DEFORMATION SUPPORT PORTION
120: MALE EYELET
121: BASE PORTION
122: SECOND BONDING PROTRUSION
123: CYLINDRICAL PORTION
124: FIXING PROTRUSION
125: CURVED PORTION
T: TARPAULIN

The invention claimed is:

1. Eyelets for a tarpaulin comprising:
a female eyelet; and
a male eyelet coupled to the female eyelet with a tarpaulin interposed therebetween,
wherein the female eyelet and the male eyelet are coupled to each other through compression and bonding while the tarpaulin is inserted therebetween and are made of an olefin-based resin,
wherein the female eyelet includes a deformation support portion on a bottom surface thereof which is not in contact with the tarpaulin, the deformation support portion being configured to protrude in shape of a ring from the bottom surface of the female eyelet to prevent deformation after the female eyelet and the male eyelet are coupled, wherein the male eyelet includes a base portion, a cylindrical portion and at least one fixing protrusion, the base portion having an annular shape in which a circular hollow is formed in a central portion thereof, the cylindrical portion configured to extend from an inner perimeter provided by the hollow formed in the central portion of the base portion so as to be orthogonal to the base portion and to form a hollow cylindrical space, the at least one fixing protrusion being formed on an outer circumferential surface of the cylindrical portion to increase a coupling strength between the female eyelet and the male eyelet.

2. The eyelets for a tarpaulin of claim 1, wherein the olefin-based resin is any one of polyethylene (PE) and polypropylene (PP).

3. The eyelets for a tarpaulin of claim 1, wherein the female eyelet is provided to have an annular shape in which a circular hollow is formed in a central portion thereof.

4. The eyelets for a tarpaulin of claim 3, wherein at least one first bonding protrusion is provided along a perimeter of the female eyelet on one side surface of the female eyelet, which is in contact with the tarpaulin, to have a predetermined diameter.

5. The eyelets for a tarpaulin of claim 4, wherein at least one second bonding protrusion formed to protrude at a position corresponding to the first bonding protrusion of the female eyelet is provided along the perimeter of the base portion on one side surface of the base portion, which is in contact with the tarpaulin, to have a predetermined diameter.

6. The eyelets for a tarpaulin of claim 1, wherein the male eyelet further includes:

a curved portion curvedly formed in a portion in which the base portion and the cylindrical portion are in orthogonal contact with each other is provided, and a diameter of the cylindrical portion is smaller than a diameter of a hollow formed in a central portion of the female eyelet so as to be coupled to the female eyelet.

7. The eyelets for a tarpaulin of claim 1, wherein the at least one fixing protrusion is arranged in at least one line along a perimeter of the outer circumferential surface of the cylindrical portion.

8. The eyelets for a tarpaulin of claim 1, wherein the at least one fixing protrusion is configured to be bonded to the female eyelet when the cylindrical portion is coupled to the female eyelet.

\* \* \* \* \*